United States Patent [19]

Bock

[11] Patent Number: 4,761,532

[45] Date of Patent: Aug. 2, 1988

[54] RESISTANCE WELDING APPARATUS

[75] Inventor: Oscar L. Bock, Sun City, Ariz.

[73] Assignee: Bock Corporation, Madison, Wis.

[21] Appl. No.: 103,525

[22] Filed: Sep. 30, 1987

[51] Int. Cl.$^4$ .................. B23K 11/00; B23K 11/32
[52] U.S. Cl. .......................................... 219/79; 219/66
[58] Field of Search ................ 219/66, 79, 80, 103, 219/107; 414/14, 16, 18, 49; 228/6.1, 49.1

[56] References Cited

U.S. PATENT DOCUMENTS

| | | | |
|---|---|---|---|
| 2,550,965 | 5/1951 | Brown | 219/107 X |
| 3,600,548 | 8/1971 | Bock | 219/79 |
| 4,219,120 | 8/1980 | Rysti | 414/49 X |
| 4,239,953 | 12/1980 | Bock | 219/79 |
| 4,716,268 | 12/1987 | Wacker | 219/79 X |

*Primary Examiner*—H. Broome
*Assistant Examiner*—Catherine M. Sigda
*Attorney, Agent, or Firm*—Isaksen, Lathrop, Esch, Hart & Clark

[57] ABSTRACT

A resistance welding apparatus (10) is disclosed which is particularly adapted for use in welding parts (27) into the interior surface of a metal tube (17) in a pre-determined pattern obtained by longitudinal and rotational indexing of the tube. An elongated electrode arm (20) extends into the tube and has a feed track (35) attached thereto through which the metal pieces (27) to be welded are moved down the length of the electrode arm (20). The other end of the electrode arm (20) is rigidly connected to a mount (21) and is electrically insulated therefrom. At the end of the feed track (35), a lever (61) aligns the lead metal piece so as to be at the same level as an end support (43), and a pusher lug (41) advances the metal piece to the end support (43). A piston (46) carried by the end support and acting against the inside wall of the tube moves the end support (43) transversely of the electrical arm to bring the piece (27) to be welded into pressure contact with the inside of the tube (17). Electrical current is then passed through the electrode arm (20) and the piece to be welded, to the tube (17), and then to a grounded contact (47), to resistance weld the metal piece to the tube (17).

6 Claims, 4 Drawing Sheets

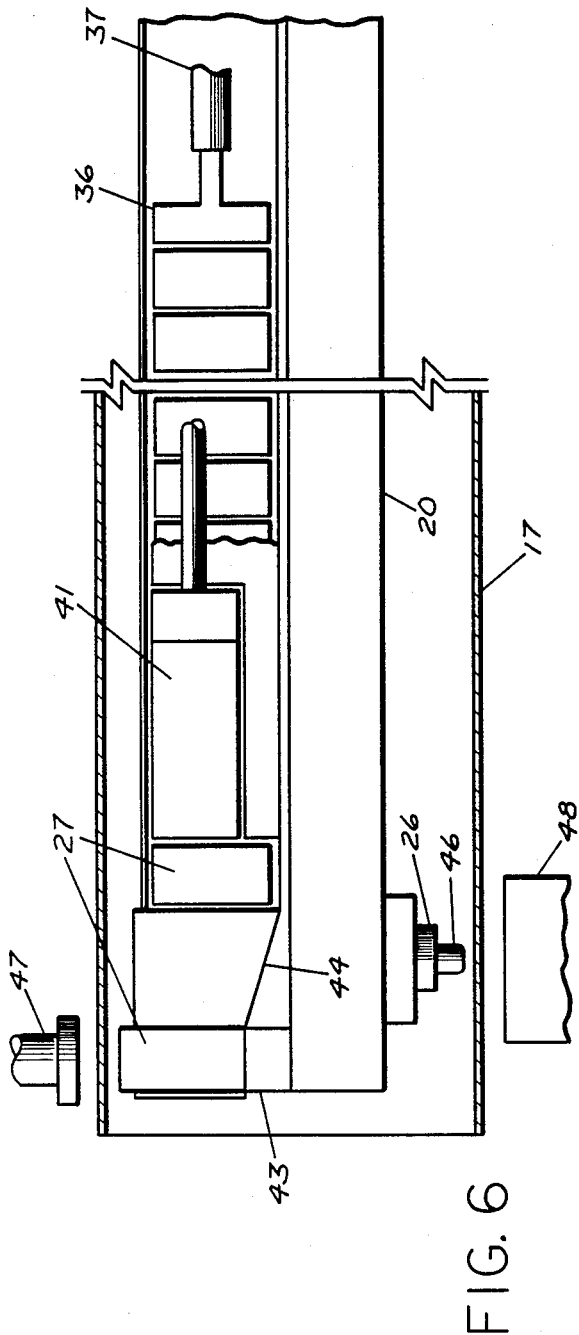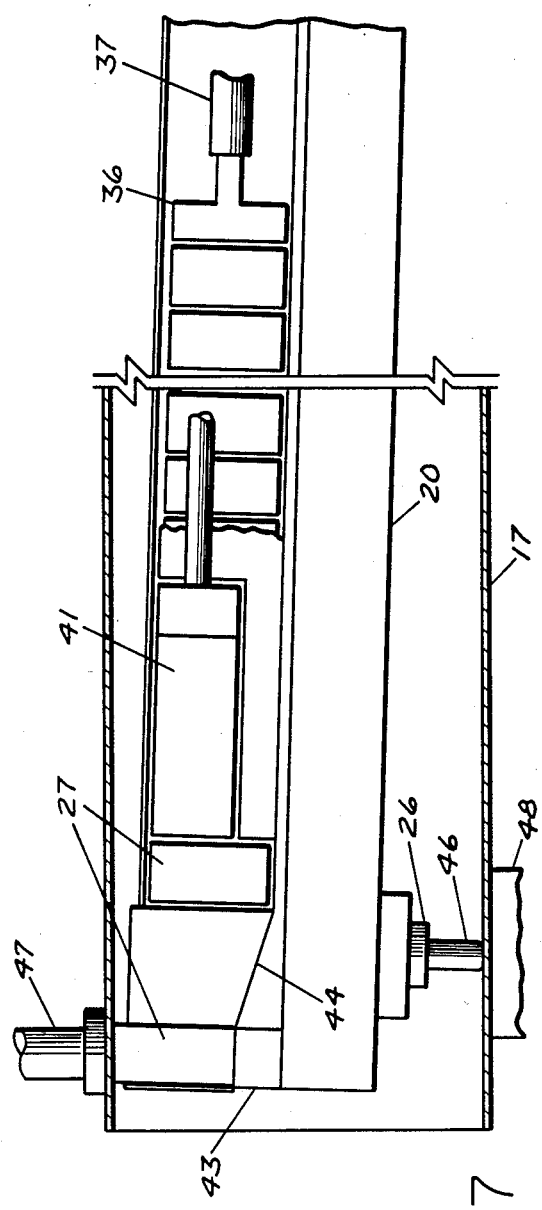

RESISTANCE WELDING APPARATUS

TECHNICAL FIELD

This invention pertains generally to resistance welding machines and particularly to those adapted to weld metal parts in a tube or other confined areas.

BACKGROUND OF THE INVENTION

Tubes having welded metal baffles on their interior surface are commonly used as heat exchange members in boilers, water heaters, and in other heat exchange devices. Prior apparatus for welding such baffle pieces within a tube is shown in U.S. Pat. Nos 3,600,548 and 4,239,953 to Bock. The machines disclosed therein include an elongated electrode arm that is cantilever mounted to and insulated from a mounting member at one of its ends. The arm is made up of a material having high electrical conductivity and has a welding head mounted on its free end. The baffle pieces are delivered to the desired positions for welding on the interior of the tubing by a sequence of mechanical conveyances that are integrated with the electrode arm. The baffle pieces are dispensed from a chute onto a feed track. The baffle pieces are pushed along the feed track in single file by a baffle pusher which is driven by a spring retracted air cylinder. As each piece reaches the end of the feed track, an assembly commonly called a slicer displaces the lead piece out of the single file line so that it falls into position in front of a pusher lug. The baffle pieces are then driven forwardly by a pusher lug which is driven by a reciprocally acting air cylinder. The pusher lug advances the baffle pieces up a ramp to a position where the baffle pieces are clamped in place against the inside of the tubing by a hydraulic cylinder, and the welding process is commenced. The process is then repeated for each successive baffle piece on the feed track.

Difficulties can result from the method of baffle conveyance described above at the point where the slicer displaces the baffle pieces. In pushing the leading baffle piece so as to fall in an uncontrolled manner in front of the pusher lug, the baffle pieces do not always lie flat at the end of their fall. This interferes with the forward motion of the pusher, and often results in production delays that are necessary to rectify the problem.

SUMMARY OF THE INVENTION

The invention comprises an improved resistance welding machine which delivers metal pieces to the desired location for welding on the inside wall of tubing or other confined areas. The electrode arm structure and the transfer of the baffle pieces along a feed track on the electrode arm are as described above. In the present invention, the transfer of baffle pieces from the feed track to the ramp is accomplished in a controlled manner. The means of transfer is by a pivoting two-position lever. In one position, the top surface of the lever is level with the feed track, and the baffle pusher pushes the lead baffle piece onto the lever. The lever is then raised by a reciprocally acting air cylinder that pivots the lever to a second position wherein the top surface of the lever is level with both the pusher lug and the ramp. The pusher lug then advances the baffle pieces up a ramp to a position where the baffle pieces are clamped in place for welding. The lever is then lowered to repeat the process with the next baffle piece.

The controlled transfer of the baffle pieces from the feed track to the ramp alleviates significant production delays that result from not having the baffle pieces fall in a predictable manner. The present invention, therefore, increases productivity by decreasing the down time of the machine. The present invention also increases efficiency by decreasing the cycle time between baffle piece welds. The new invention is faster as the pusher lug does not have to wait for the baffle pieces to fall.

Further objects, features, and advantages of the invention will be apparent from the following detailed description taken in conjunction with the accompanying drawings.

BRIEF DESCRIPTION OF THE DRAWINGS

In the drawings:

FIG. 6 is a top cross-sectional view through the tube with the electrode arm shown in its normal retracted position away from the inside walls of the tube.

FIG. 7 is a top cross-sectional view through the tube showing the electrode arm in position to make welding contact between a baffle piece and the inside of the tube.

DESCRIPTION OF THE PREFERRED EMBODIMENT

Figure 1:
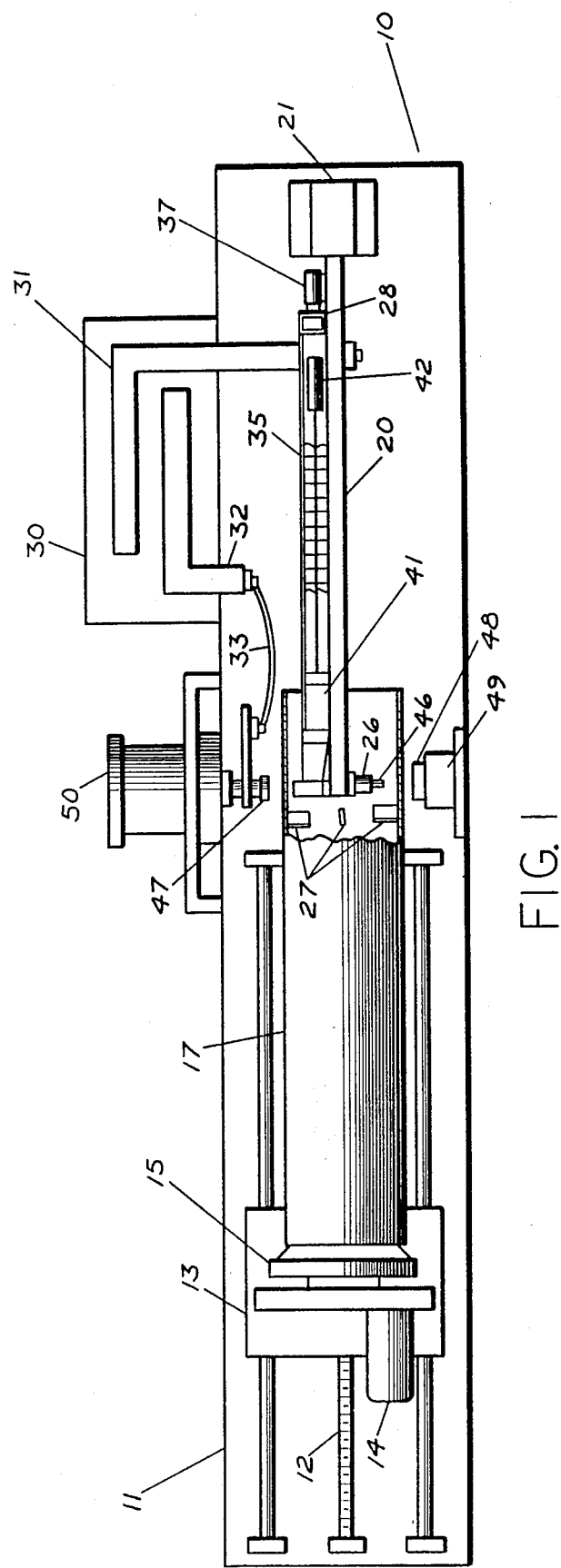
FIG. 1 is a top plan view showing a resistance welding apparatus in accordance with the invention in operational position to weld baffle pieces to a tube, with portions of the tube being welded broken away for purposes of illustration.
Figure 2:
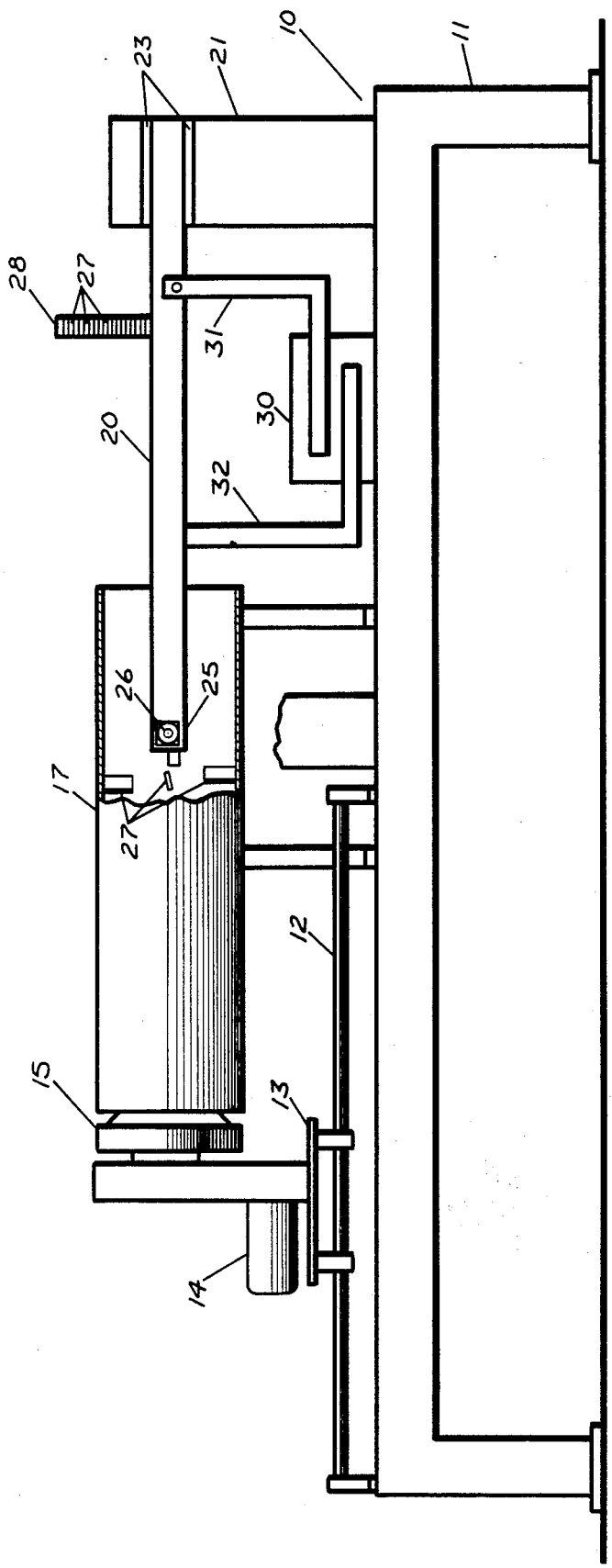
FIG. 2 is a front elevational view of the apparatus of FIG. 1 with portions of the tube and the apparatus being broken away for purposes of illustration.

With reference to the drawings, wherein like numerals refer to like parts in each view, the resistance welding apparatus of the invention is shown generally at 10 in FIG. 1. The apparatus is particularly adapted for welding baffle pieces in a spiral pattern in a heat exchange tube, although it would be apparent to those skilled in the art that such apparatus can be utilized for other purposes requiring similar resistance welding within a confined area. The apparatus has a machine frame 11, an indexing screw 12 rotatably mounted at each end to the machine frame 11, and a carriage assembly 13 mounted to the indexing screw to be linearly moved by rotation of the screw. The carriage assembly includes an electric motor 14 connected to rotate a tube gripper 15 which is engaged at one end to the metal tube 17 in which the metal baffles are to be welded. The gripper 15 is adapted to hold the tube 17 in substantially cantilevered position as shown in FIGS. 1 and 2, and is insulated to electrically isolate the tube 17 from the carriage 13.

An elongated electrode arm 20 is rigidly mounted at one end to a mounting member 21 which is itself attached to the machine frame 11. As best shown in FIG.

2, insulated supports 23 rigidly attach the electrode arm 20 to the mounting member 21 while electrically insulating the arm from the mounting member and the rest of the apparatus. The electrode arm 20 extends in cantilever fashion into the hollow interior of the tube 17. The free end 25 of the electrode arm 20 has a horizontally disposed drive cylinder 26 mounted thereon. A stack of baffle pieces 27 is delivered by a baffle chute 28 to a baffle track (not shown in FIG. 2) mounted to the electrode arm 20.

The electric welding current is delivered by a welding generator 30 through a power supply bus conductor 31 to the electrode arm 20 at a point of attachment near the end at which it is mounted. A ground conductor 32 is connected by a flexible strap 33 to the ground contact 47 to provide a return path for current to the welding generator 30.

Figure 3:
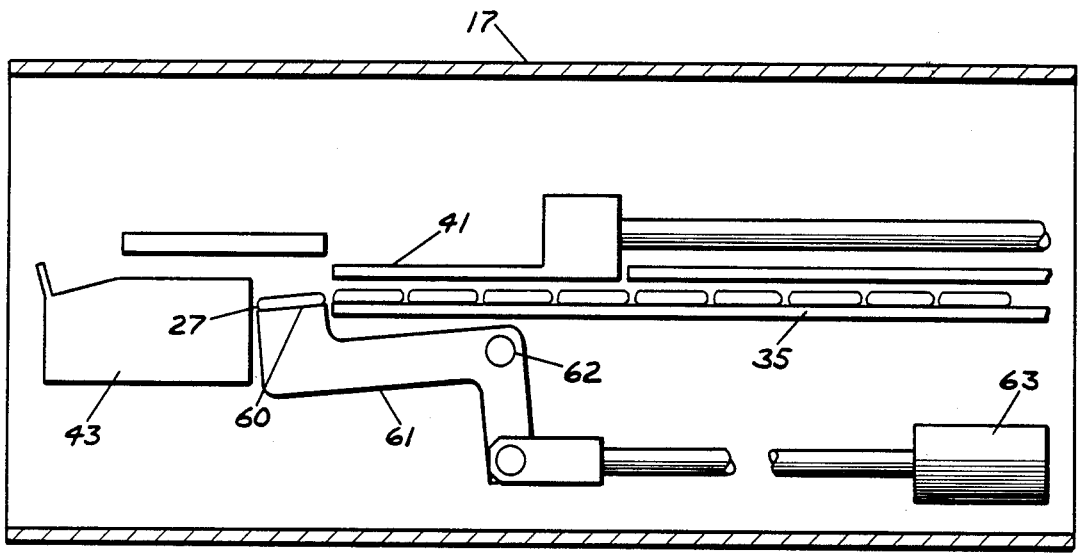
FIG. 3 is a side cross-sectional view through the tube with the lever in lowered position in which its top surface is level with the feed track.
Figure 4:
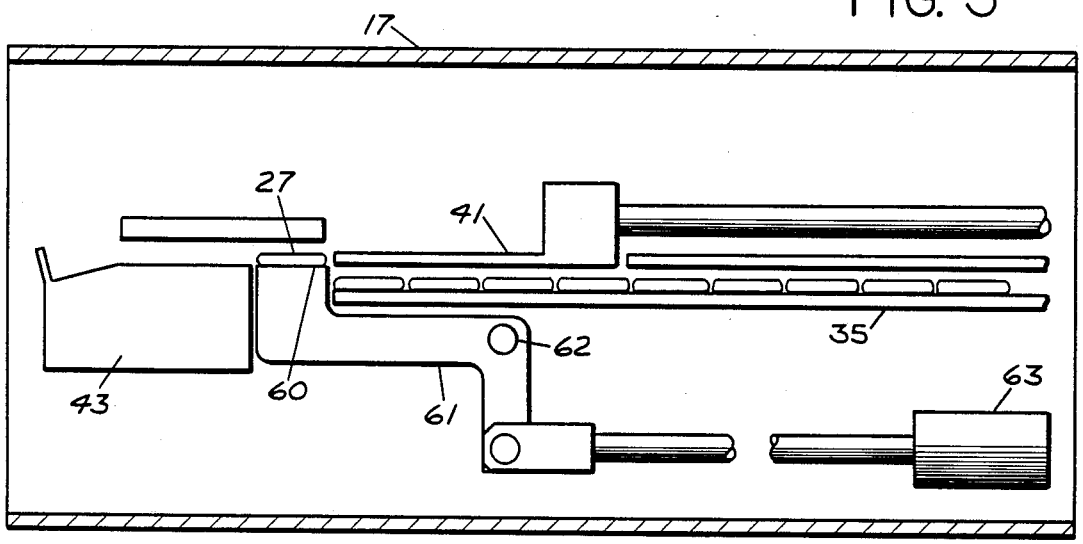
FIG. 4 is a side cross-sectional view through the tube with the lever in the raised position wherein its top surface is level with the ramp and pusher lug, the pusher lug being in the retracted position.
Figure 5:
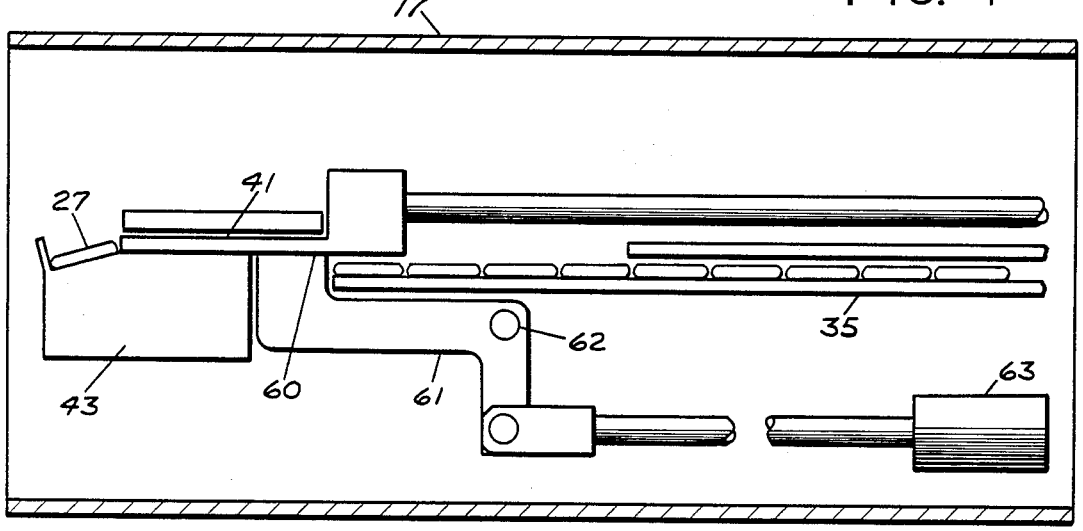
FIG. 5 is a side cross-sectional view through the tube with the lever in the raised position in which its top surface is even with the ramp and pusher lug, the pusher lug being in the extended position.

The operation of the welding apparatus within the tube is best shown with reference to the views of FIGS. 3–7, each of which is a view of the free end of the electrode arm and with the tube partially cut away. The views of FIGS. 3–5 in particular are elevational views of the free end of the electrode arm as seen in FIG. 2, with the electrode arm being shown in dashed lines to allow parts of the apparatus on the side of the arm to be seen which would otherwise be hidden. As shown therein, baffle pieces from the chute 28 are received on a baffle feed track 35 which is attached to the side of the electrode arm 20. The baffle pieces are pushed along the track 35 by a baffle pusher 36 which is driven by a spring retracted air cylinder 37. As best depicted in FIG. 3, the baffle pieces are advanced one at a time by the baffle pusher 36 onto a flat top surface 60 of a lever 61 at the end of the feed track 35. As shown in FIG. 4, the lever 61 is then pivoted at a fulcrum 62, causing the lever 61 to raise the lead baffle to a point where it is level with a pusher lug 41. The lever 61 is driven by a reciprocally acting air cylinder 63. As shown in FIG. 5, the individually indexed baffle pieces 27 are then driven forwardly by the pusher lug 41 which is driven by a reciprocally acting air cylinder 42 to pass just above the top surface 60 of the lever. The pusher lug pushes each piece to a baffle end support 43 which is firmly mounted and electrically connected to the electrode arm 20.

The view of FIG. 6 is a top view of the free end of the electrode arm. As seen in FIG. 6, the pusher lug 41 advances the baffle pieces up a ramp 44 to a position on the baffle end support 43 wherein the baffle piece to be welded extends outwardly beyond the baffle feed track. The hydraulic drive cylinder 26 has a plunger 46 shown in retracted position in FIG. 6. The plunger 46 is preferably made of a strong material that has high electrical resistance. In the unactivated position shown in FIG. 6, a back-up electrical contact 47, which is electrically connected to the ground conductor 32, is in its retracted position out of contact with the outer wall of the tube. A counter-acting electrically insulating abutment member 48 is also retracted from engagement with the outside surface of the tube.

Activation of the hydraulic drive cylinder 26 presses the plunger 46 into contact with the inner wall of the tube, as best shown in FIG. 7. The tube is backed up by the counter-acting abutment member 48, which is driven into firm contact with the outside of the tube by a power cylinder 49. The strong force applied by the hydraulic cylinder 26, which preferably has the capacity to apply up to 1,000 p.s.i. to the plunger 46, forces the electrode arm 20 to flex toward the opposite wall of the tube and to thus bring the extending baffle piece 27 into firm contact with the inside surface. At the same time, the back-up contact 47 is driven into contact with the outside surface of the tube by a power cylinder 50, and a current surge is passed from the welding generator through the electrode arm 20, baffle end support 43, baffle 27, tube 17, and back-up contact 47, to complete the circuit to the generator 30.

In order to achieve the aforementioned spiral pattern, the tube is moved to a new position after each baffle piece is welded. The first weld is made with the tube as far onto the cantilevered electrode arm 20 as may be desired for the beginning of the baffles. After each baffle piece is welded, the tube is then rotated slightly by rotation of gripping member 15 and backed-off the electrode arm by the indexing screw 12. This rotational and longitudinal movement of the tube is preferably carried on at the same time that the baffle pieces are moved along the primary feed track of the electrode arm and lead baffle piece moved into position on the welding head. The cycle is repeated until the desired number of baffles have been welded in the tube. The tube is then removed from the machine by loosening gripping member 15 and another tube positioned thereon and readied for welding.

It is understood that the invention is not confined to the particular construction and arrangement of parts herein illustrated and described, but embraces all such modified forms thereof as come within the scope of the following claims.

What is claimed is:

1. A resistance welding apparatus for welding metal pieces to the inside surface of a metal tube, comprising:
    (a) means for holding the tube in which the metal pieces are to be welded;
    (b) an elongated electrically conductive electrode arm cantilever mounted at one end, and having a free end that is inserted into the tube in which the pieces are to be welded, and including a track for supporting a row of the pieces to be welded and having an outer end near the free end of the electrode arm;
    (c) means for feeding a plurality of the metal pieces to be welded in single file along the track of the electrode arm toward the free end;
    (d) means, having a top surface that receives the metal pieces at a first level position as the metal pieces are pushed off of the end of the track by the means for feeding, for controllably displacing the metal pieces to a second level position;
    (e) an end support mounted to and electrically connected to the free end of the electrode arm for receiving and holding metal pieces to be welded in proper position for welding to the inside of the tube;
    (f) means for pushing a metal piece to be welded off of the top surface of the means for controllably displacing when the top surface is at the second level position onto the end support; and
    (g) a drive cylinder mounted to the electrode arm and having a plunger, the drive cylinder being mounted to the electrode arm in position to have the plunger press against the inside surface of the tube to drive the electrode arm such that metal pieces to be welded held by the end support are driven into firm contact with the inside of the tube.

2. The resistance welding apparatus of claim 1 wherein the tube holding means includes indexing means for rotationally and longitudinally indexing the tube.

3. The resistance welding apparatus of claim 1 wherein the means for feeding a plurality of the metal pieces includes a spring retracted air cylinder.

4. The resistance welding apparatus of claim 1 wherein the means for controllably displacing the metal pieces includes a lever having a top surface which defines the top surface of the means for controllably displacing, the lever pivotally mounted to the electrode arm and positioned such that when the lever top surface is at the first level position the top surface of the lever will support a metal piece to be welded which is pushed off of the end of the track by the means for feeding, and such that when the lever is pivoted to bring its top surface to its second level position, a metal piece to be welded supported on the top surface of the lever is at the level of the end support.

5. The resistance welding apparatus of claim 4 wherein the means for controllably displacing further includes a reciprocally acting air cylinder connected to the lever to selectively pivot the same.

6. The resistance welding apparatus of claim 1 wherein the means for pushing a metal piece to be welded off of the top surface of the means for controllably displacing includes a drive cylinder connected to push and retract a pusher lug.

* * * * *